May 30, 1933. A. SAURBREY 1,911,397
APPARATUS FOR HANDLING MATERIALS
Filed May 13, 1931 5 Sheets-Sheet 1
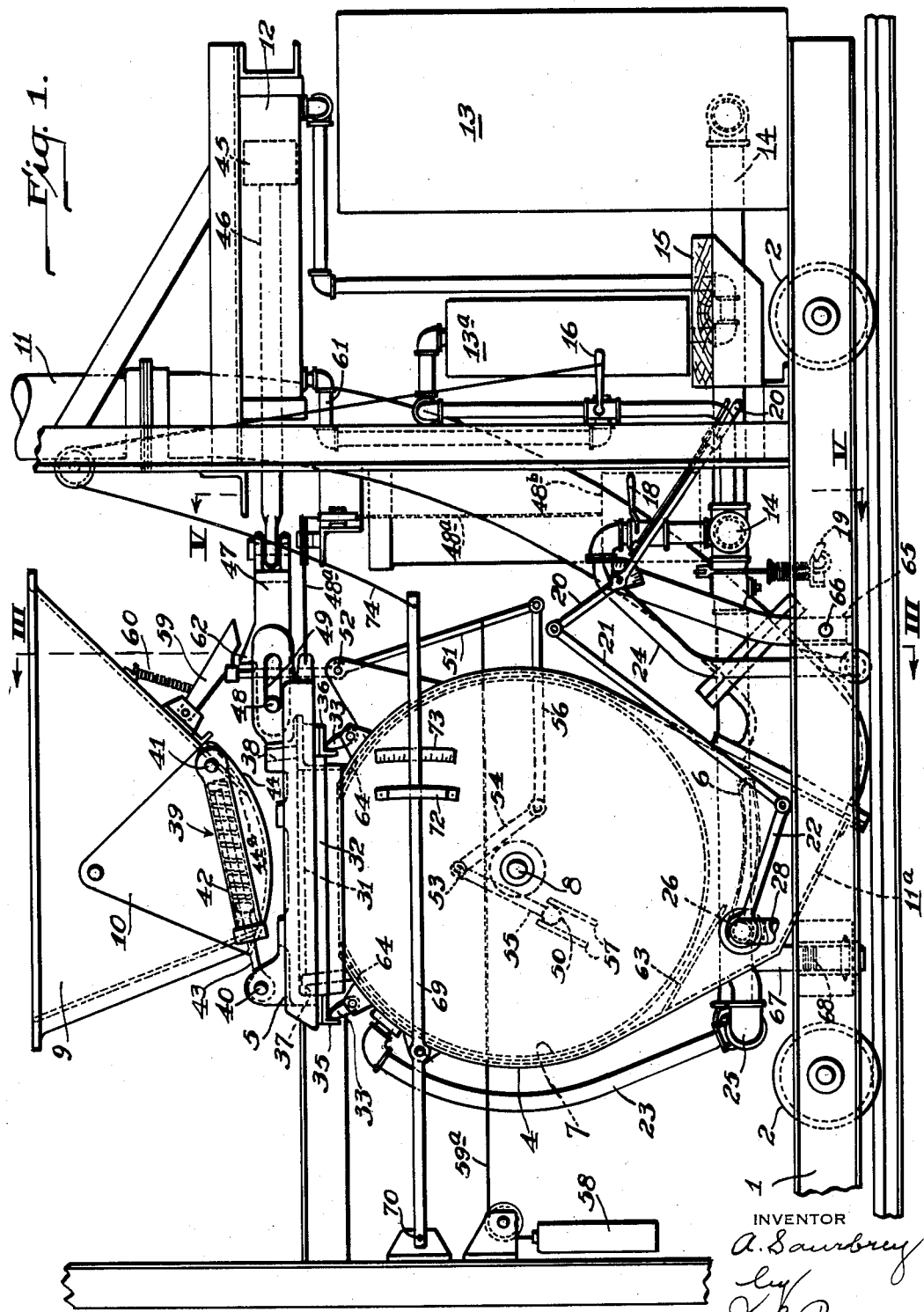
Fig. 1.
INVENTOR

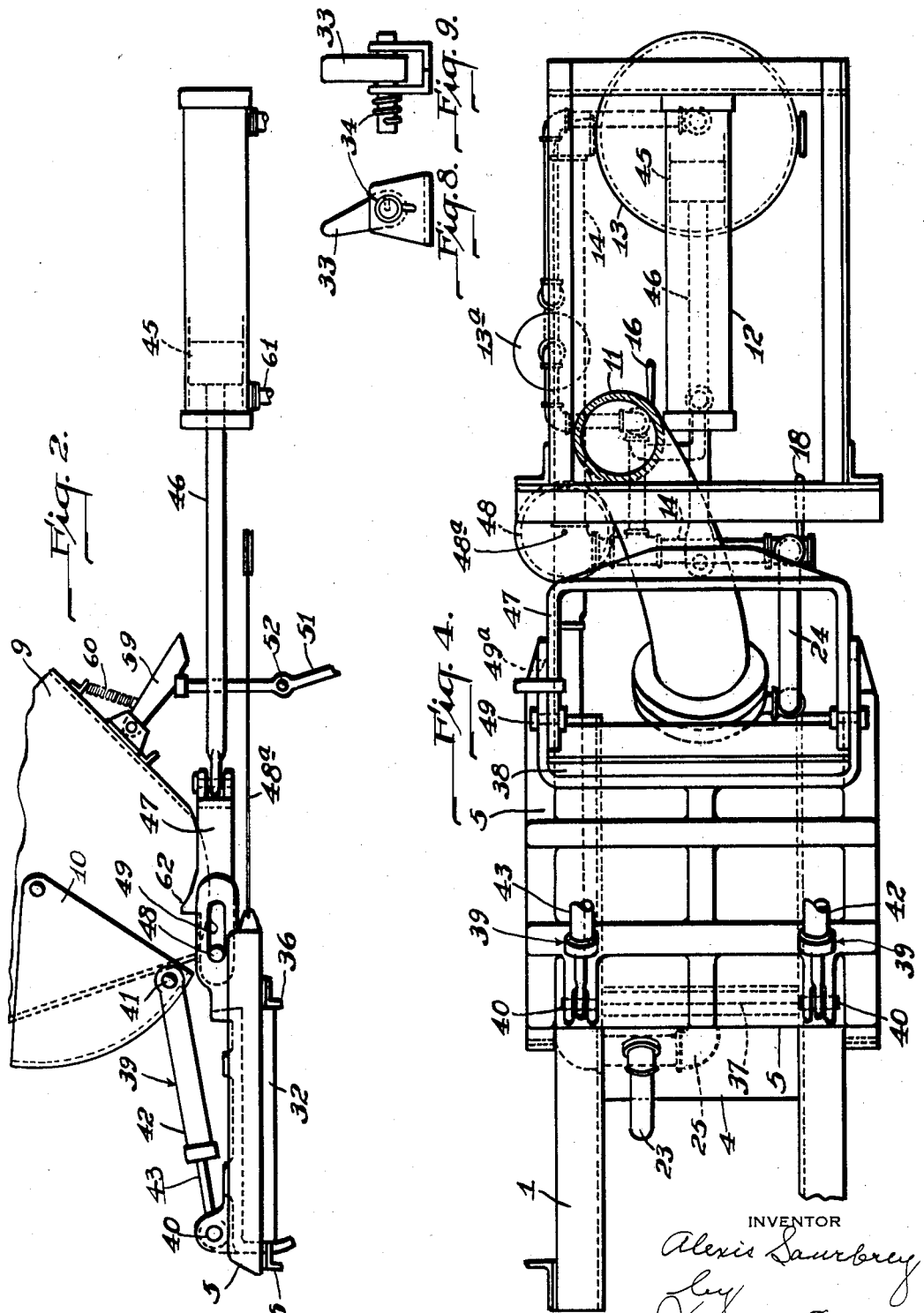

May 30, 1933. A. SAURBREY 1,911,397
APPARATUS FOR HANDLING MATERIALS
Filed May 13, 1931 5 Sheets-Sheet 3
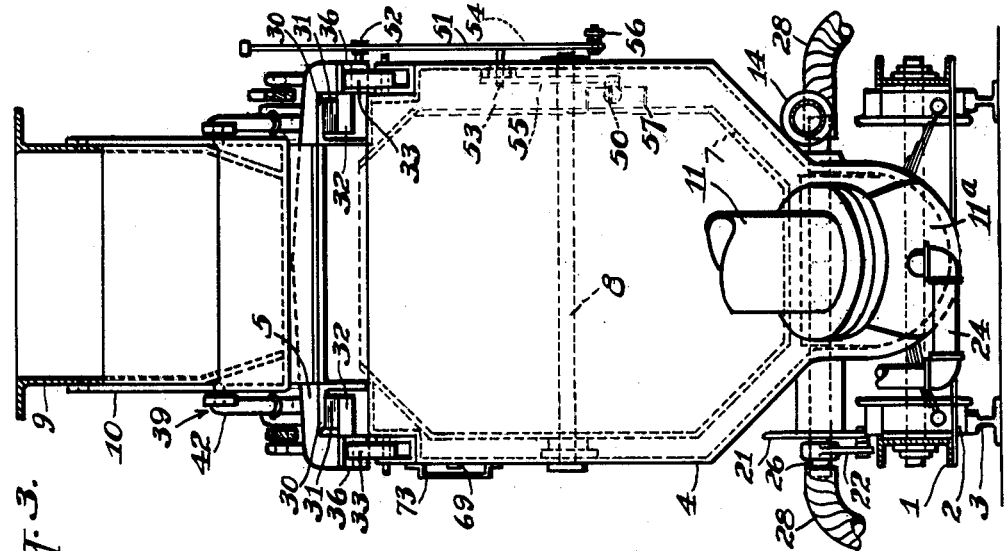
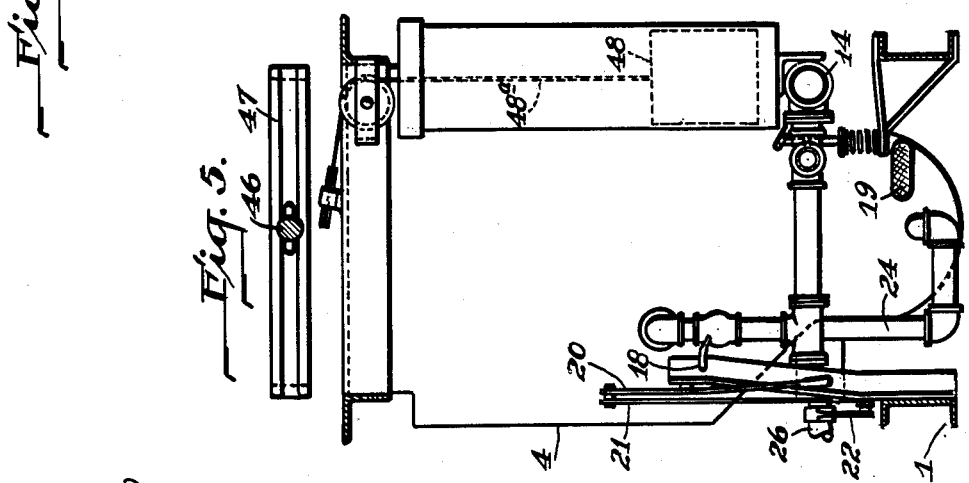
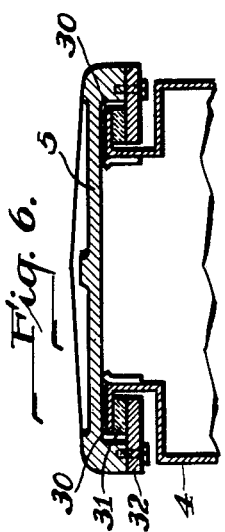
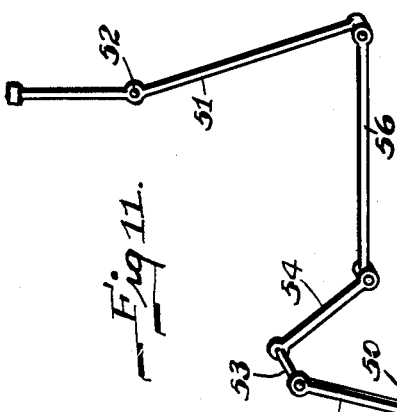
INVENTOR
A. Saurbrey May 30, 1933.  A. SAURBREY  1,911,397
APPARATUS FOR HANDLING MATERIALS
Filed May 13, 1931  5 Sheets-Sheet 4
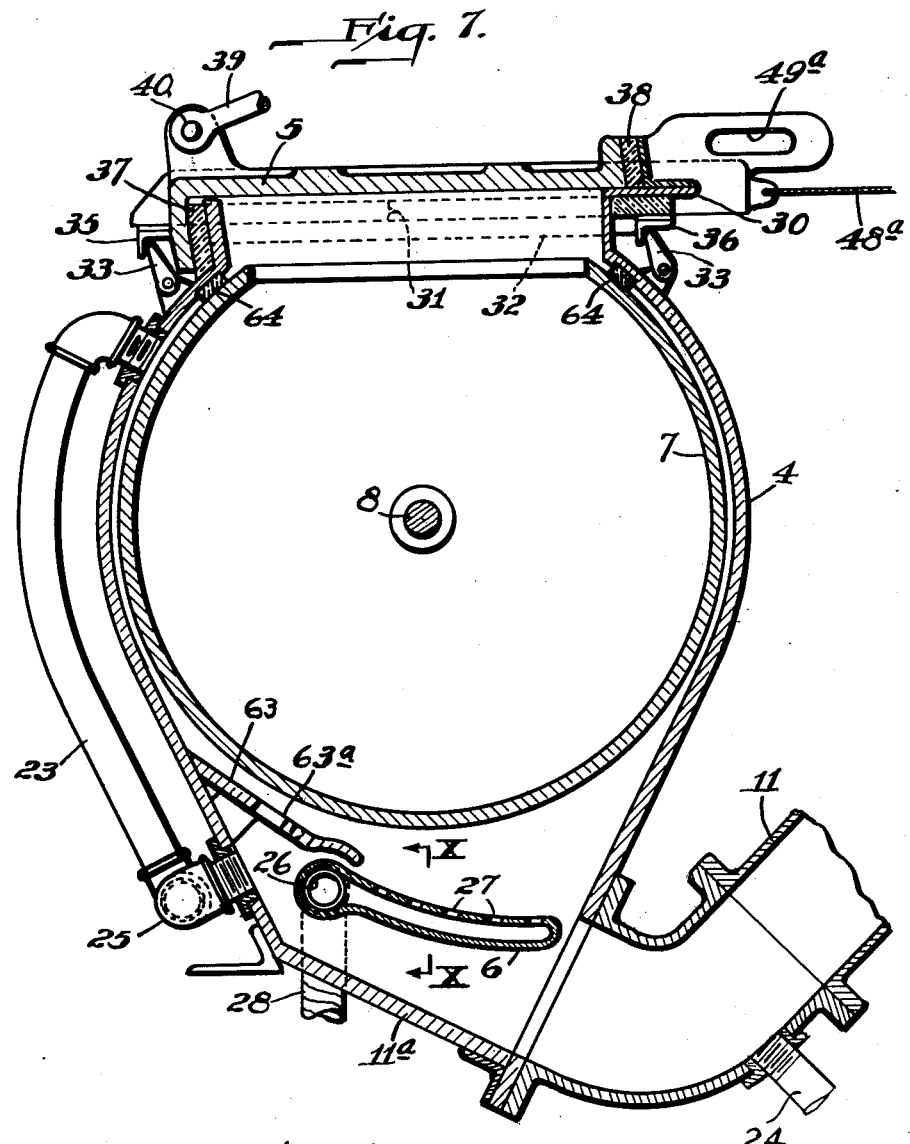
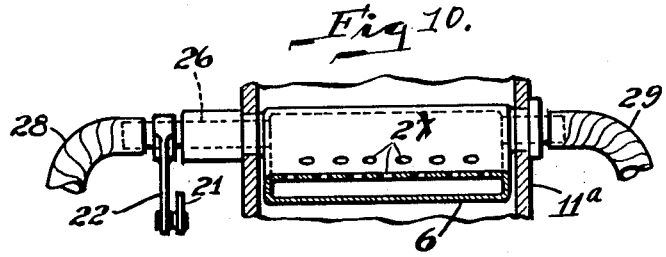
INVENTOR
Alexis Saurbrey
by
James C. Bradley
atty May 30, 1933.  A. SAURBREY  1,911,397
APPARATUS FOR HANDLING MATERIALS
Filed May 13, 1931   5 Sheets-Sheet 5

INVENTOR
Alexis Saurbrey
by
James C. Bradley
Atty.

Patented May 30, 1933

1,911,397

UNITED STATES PATENT OFFICE

ALEXIS SAURBREY, OF PITTSBURGH, PENNSYLVANIA

APPARATUS FOR HANDLING MATERIALS

Application filed May 13, 1931. Serial No. 537,080.

Figure 12:
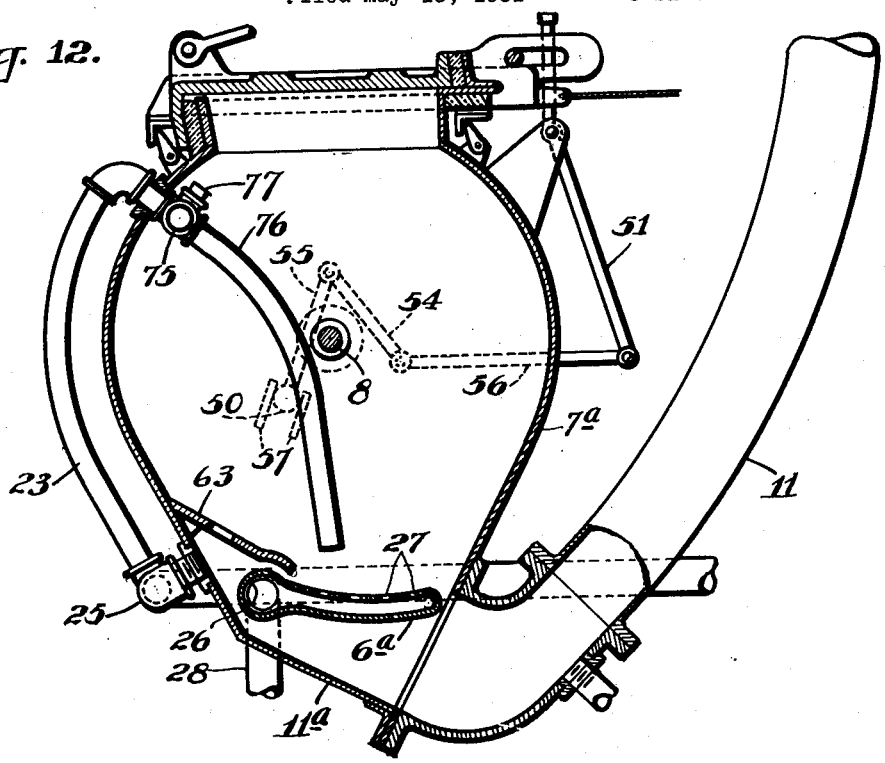
Figure 13:
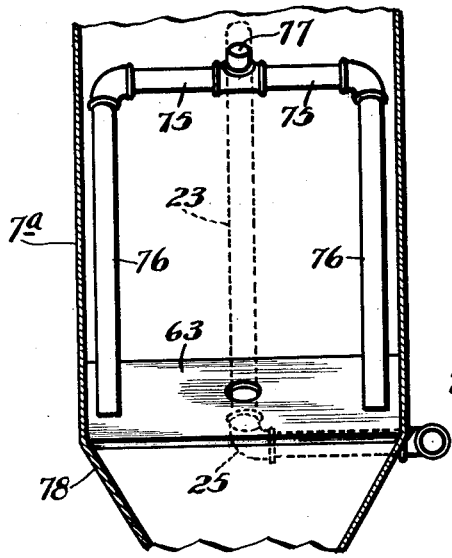
Figure 14:
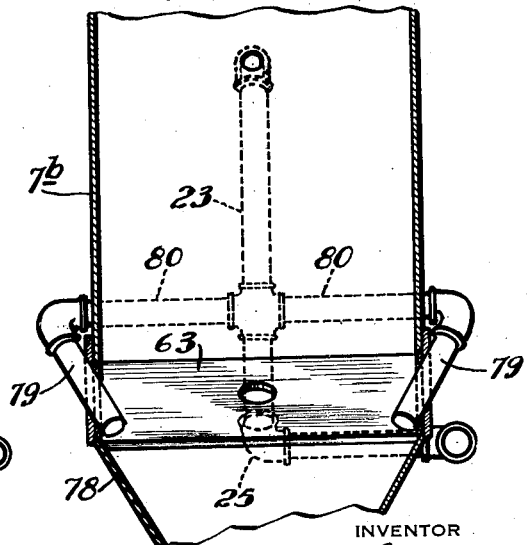

The invention relates to an apparatus for handling and conveying divided materials such as concrete, gravel, dry sand, crushed stone, coal, and coke. The invention is illustrated and described as applied to apparatus for receiving material from a bin or hopper mounted over the apparatus, and transporting it to a container, such as a form, some distance away, both horizontally and vertically, using a fluid such as air for the transporting medium. Such machines using compressed air for conveying concrete have been used for many years, and I do not broadly claim the use of compressed air for this purpose. However, trouble has been experienced with such machines to a great extent, partly because the receiving gates would fail to operate in a satisfactory manner, and partly because the discharge line would clog, thus making the machine inoperative. In actual operation, it has also been found that previous machines caused considerable segregation of material, delivering the fine material of the concrete at a place and time distinct from the coarser material causing honeycomb and streaks in the resulting concrete. In tunnel work, where these machines have found their greatest application and use, all these objectionable features assume great importance. This arises from the restricted space available in tunnels for the operation of any construction machinery employed therein, making it both tedious and expensive to take a clogged line apart to clean it, or to make adjustment of any kind to a stuck or worn gate. The principal object of the present invention is to entirely eliminate the foregoing difficulties, namely, the avoidance of any tendency of the material to separate or clog, and any tendency of the doors or gates to stick. The invention has for its further objects the provision of a machine which can be easily controlled by a single operator; which requires a minimum amount of compressed air; and which will convey a maximum amount of material in a given period of time. Certain embodiments of the invention are shown in the accompanying drawings, wherein:

Figure 1 is a side elevation of the apparatus, showing two of the gates in closed position. Fig. 2 is a partial side elevation showing the two gates in open position. Fig. 3 is a section on the line III—III of Fig. 1. Fig. 4 is a plan view with the hopper or bin removed. Fig. 5 is a section on the line V—V of Fig. 1. Fig. 6 is a vertical section through the gate at the top of the casing. Fig. 7 is an enlarged section through the casing. Figs. 8 and 9 are enlarged detail views of the gate clamping devices. Fig. 10 is a detail section on the line X—X of Fig. 7. Fig. 11 is a detail perspective view. Figs. 12 and 13 are sections through a modification. And Fig. 14 is a section through another modification.

Referring to the drawings, 1 is a framework provided with wheels 2 and mounted on tracks 3; 4 is a cylindrical casing mounted upon the framework as later described and provided with the slide gate 5 at its upper end and the swinging gate or valve 6 at its lower end; 7 is a drum mounted for rotation in the casing upon the bar 8; 9 is a hopper or bin located above the casing and provided with a swinging gate 10; 11 is a conduit having an enlargement or "boot" 11a at its end leading from the lower end of the casing for conveying material, such as concrete to any desired point of use; 12 is an air cylinder for operating the gates 5 and 10; 13 is a compressed air tank for supplying air to the manifold 14 and thence to the casing 4, the conduit 11, the auxiliary tank 13a and the cylinder 12, such tank being itself supplied with air by means of a motor and compressor, not shown; and 15 is the operator's seat from which the air valve handles 16 and 18 are accessible as well as the foot control 19.

The apparatus is so arranged that the operation of the cylinder 12 opens the gates 5 and 10 successively, permitting a discharge from the bin 9 to the casing, after which the gates 10 and 5 are closed successively. The charge passing into the casing is received by the drum 7 which now rotates through about 180 degrees so that the material flows onto the door or gate 6 whose degree of opening is regulated by the operator through the handle 20, link 21, and lever 22. Air pressure is applied to the drum and conduit by means of the pipes 23, 24 and 25, all communicating with the tank 13 and controlled by the valves operated by the handle 18 and the foot treadle 19. These sources of air supply may be operated together or in any desired sequence at the discretion of the operator after the gate 5 is closed. The pintle 26 of the gate 6 is preferably hollow and communicates with a cavity in the gate itself which has perforations 27 (Fig. 7) through its face so that fluid, either air or water, separately or at the same time, may be supplied through such perforations. Flexible pipes 28, 29 (Fig. 10) are connected to the ends of the pintle, one of which may be connected to the tank 13 and the other to a source of water pressure controlled by suitable valves which are not shown. The directing of the conduit 11 upwardly from the bottom of the container, as shown, is of advantage over a construction in which the conduit extends horizontally, as in the latter case the air often escapes over the top of the material when it does not completely fill the conduit. With the present construction, the conduit is completely filled with the material.

The inlet to the casing 4 has a pair of laterally extending flanges 30, 30 at its sides (Fig. 6) upon which the gate 5 slides. Packing strips 31, 31 are carried on the lower sides of the flanges in order to secure an air tight joint, as later described. The gate 5 has flanges 32, 32 lying beneath the flanges 31, 31, and when the gate approaches closed position, these flanges are forced upward to compress the packing and thus prevent leakage. This is accomplished by the pairs of rocker arms 33, 33 (Figs. 8 and 9). They are normally swung to the left by springs 34 (Fig. 8), but when the gate approaches closed position, as indicated in Fig. 1, the flanges 35 and 36 on the gate engage the arms and swing them to the right, thus forcing the gate upward and compressing the packing strips 31. Other flexible packing strips 37 and 38 are provided at the ends of the gate between suitable flanges thereon and on the top of the casing, so that when the gate is pulled tightly shut, it is securely seated against leakage on all four sides.

The swinging gate 10 is operated from the gate 5 by means of a pair of links 39 pivoted at 40 and 41. The links are each made up of a pair of telescopic members 42 and 43 with a compression spring therebetween the arrangement being such that the spring is under compression when the gates are closed. The gate 10 is thus closed in advance of the gate 5 and opened after it. The spring closure of the gate 10 prevents breakage in case an obstruction, such as a large piece of material, blocks the gate 10 open. The opening of the gate 5 before the gate 10 opens avoids the deposit of material on the gate 5. The gate 10 is also provided with a protruding lip 44 which overlaps the lip 44a and cuts off material ahead of the closing of such gate. On the opening movement of the gates, the dropping of material is delayed until the gate 5 is open, thus keeping the latter gate clean.

The gate 5 is opened from the cylinder 12 provided with the piston 45 and the rod 46. The rod is connected to a link 47 provided with a pin 48 working in a slot 49 in the end of the gate 5, thus providing a lost motion connection between the gate and link 47. When air is admitted behind the piston 45, by moving the valve handle 16 to the position shown, the gate 5 is moved to the open position of Fig. 2, thus opening the gate 10. When the air is released from behind the plunger, by moving the valve handle to vertical position, thus cutting off the supply of air from the manifold 14 and venting the air from behind the piston to the atmosphere, a counterweight 48b attached to the end of the gate by the cable 48a moves the gate back to the position of Fig. 1.

The further movement of the link 47 by the piston 45 also controls the swinging movement of the drum 7 from the position shown in Figs. 1 and 7 (with its opening up) to one at 180 degrees thereto (with its opening down) and back again as presently described. The drum is pivotally mounted on the transverse rod 8 (Fig. 3) which extends through the walls of the casing 4 and acts as a stay rod for such walls. The drum is rocked from one position to the other by means of a lever 51 pivoted at 52 upon a bracket secured to the casing 4. A shaft 53 extends through the side wall of the casing 4 in suitable air tight bearings and has secured to its ends the lever arms 54 and 55 (Fig. 11) the former lying inside the casing and the latter outside of it, and connected to the lever 51 by the link 56. The lever 54 has at one side of its end a knob or ball 50 lying between the cleats 57, 57 secured to the outer face of the drum. A counterweight 58 is secured to the lever 51 by the cable 59a, and when such lever is free to move, it will be swung to the left by the weight 58 and the drum rotated 180 degrees in a clockwise direction from the position shown in Fig. 1 to one in which its opening is in registry with the outlet at the bottom of the casing 4. When the lever 51 is moved back to the position shown, the drum will be rotated back to its starting position with its opening next to the gate 5.

The upper end of the lever 51 is held in the position shown by the keeper or latch 59 carried by the bin 9, and normally pressed down by the spring 60. After the gate is closed by the link 47, as heretofore described, the movement of the link 47 to the right is continued, due to the admission to the cylinder 12 on the left of the piston 45 of a small amount of air from the pipe 61, which air is switched on when the valve handle 16 is moved to cut off the air to the right of the piston. This movement causes a lug 62 on the link to engage and lift the keeper 59, thus releasing the lever 51, so that the weight 58 acts to swing the drum to discharge position with its outlet down, as heretofore described. If now air is admitted to the right of the piston 45, the link 47 is first moved to the left, so that the lug 62 engages the upper end of the lever 51 and moves it to the left until it reaches the position shown, and is engaged by the keeper 59. During this movement, the drum 7 is swung from discharge position back to charging position with its opening up. Due to the pin and slot connection 48, 49 between the link 47 and gate 5, this return movement of the drum is accomplished before the gate starts to open. The drum is thus in position to receive the charge from the bin 9 by the time the gates 5 and 10 are in position to permit a discharge of material. As heretofore explained, the gate 5 is opened in advance of the gate 10 due to the spring connection, so that no discharge from the bin onto the top of the gate 5 can occur.

The air supplied to the casing 4 through the pipe 25 discharges against a baffle 63, as indicated in Fig. 7, so that a flow of air is directed into the casing along the upper and lower faces of the swinging gate 6. This serves to clean the gate and prevents any material from lodging in the space beneath the gate and interfering with its opening movement. An equalizing opening 63a also permits the passage of some air through the baffle and into the space between the drum and the casing. Air may be also supplied into the conduit 11 from the pipe 24 having a valve controlled by the handle 18. This feed gives substantial assistance in moving the material through the pipe in case of any tendency toward stoppage. A pipe 23 connected to the pipe 25 serves to supply air to the upper portion of the drum acting as an equalizer and serving to give a pressure in the upper portion of the drum approximating that in lower portion, so that the material moves downward freely by gravity.

As shown in Fig. 7 packing means 64, 64 may be employed between the drum 7 and casing 4, so that when the opening in the drum is out of registration with the inlet to the casing, the drum acts as an air tight gate for the inlet opening. This would permit the gate 5 to be dispensed with, although such gate is preferably used so that practically a double seal is secured against the escape of air pressure from the casing.

The boot 11a (which constitutes the entrance end of the conduit 11), into which the casing discharges, and which acts as the base or support for the casing, is provided with a bracket 65 pivoted at 66 on the horizontal members of the frame 1, and the other side of the boot is provided with a second bracket 67, which rests upon a spring 68 carried in a recess in one of the frame members. As the loading of the casing progresses, the casing settles about 66 as a pivot, compressing the spring 68. This movement is indicated by means of the arm 69 pivoted to the frame at 70 and to the casing at 71 and having its end movable over a scale 73, a keeper 72 being provided for guiding the movement of the arm. The operator by observing the arm is informed as to the amount of charge in the casing. This is important because overloading results in preventing a proper closure of the gates and reduces the efficiency of the apparatus. As an additional safety device, the arm 69 may be connected by a rope 74 with the handle 16, so as to secure an automatic closure of the valve which admits air pressure to the right hand end of the cylinder 12. When this valve closes, the gate 5 closes and remains closed, so that there is no further admission of material to the casing.

In operation, the operator, by means of the control handle 16, regulates the opening and closing of the gates 5 and 10, as heretofore described. Intermediate the opening movements of the gate 5, the drum swings from receiving position to discharge position and back again. The outlet gate 6 is adjusted to a position determined by trial for varying conditions of operation. The material is fed from the casing and through the conduit 11 by the air supplied through the pipes 23 and 24, and through the pintle 26 of the gate, the control of such air being regulated by the judgment of the operator. Water is also supplied when desired through the pintle 26 to assist in cleaning the gate and facilitating the flow of material thereover. If the material handled is concrete and water is supplied at this point, the amount in the mixture in the bin 9 may be correspondingly reduced. The feed of the material to and through the conduit 11 is accomplished by the powerful flow of air from the pipe 25 directed along the gate and toward the conduit so that there is no tendency to pack the material into the boot and stop the operation of the machine. The supply of air into the drum above the gate is only sufficient to equalize the pressure so that the material is deposited with a pressure on the gate 6 only equal to that produced by gravity. This material is easily carried away as fast as it is deposited by the flow of air from the pipe 25. With some materials the pipe 23 may be dispensed with entirely and a satisfactory feed through the drum and conduit secured entirely by gravity and by the cross feed as provided by the pipe 25 supplemented by the flow through the hollow gate itself.

The drum 7 acts as a mixer, which mixing action may be increased by modifying the contour of the inner surface, as is well known in the mixer art. The movement of the drum back and forth, moves the material, and tends to prevent sticking in the casing. It also prevents any tendency of the material to wedge in the boot 11a due to the impact of the material in falling. It thus acts as a baffle, and in performing this function needs to be only of an extent sufficient to cover the outlet opening to the boot, in which case it is necessary to have a movement of oscillation only sufficient to cover the opening in one position and to discharge the material in another position. My invention, therefore, contemplates various modifications of the drum as to size, shape, and extent of oscillation. The drum may also be entirely dispensed with, as later described more fully, in which case the material will fall directly from the bin 9 onto the gate 6. This gate will be normally kept open in an adjusted position, but may be closed when the material is dropped on it and then opened. The use of this gate greatly reduces the tendency of the material to jam in the boot and stop the feed of the apparatus. The use of this gate is of particular advantage in this connection when the drum 7 is dispensed with as the tendency to jam is greater under these conditions. The use of the air supply along the lower and upper sides of the gate and through it, further guards against any tendency to choke the boot and conduit. This gate enables the operator to feed material (as it is fed gradually by the drum) still more gradually into the boot. This is of special importance in handling sticky material, such as concrete, because material of this kind if once stopped, is difficult to start, the tendency, under the application of pressure, being to wedge more firmly. The air as supplied along the surfaces of the gate and through it acts as a lubricant, as well as a moving force.

The vertical riser pipe 11 serves as an air lock compelling the rising air to force the material ahead of it, rather than over it, as sometimes occurs with a horizontal or sloping delivery conduit, wherein the material may not fill the cross section of the conduit. The delivery of the material downwardly through the casing 4 by gravity saves power, as compared with a horizontal feed. The power operation of the gates 5 and 10 by a single power member, saves power and simplifies the work of the operator. The provisions for making the gate 5 tight, comprising the wedging arms 33, also adds to economy in the use of air. The placing of the packing strips 31 so that they are outside the casing and protected from the material handled adds to the life of the closure means and insures tight connections after a long period of use.

Figs. 12 and 13 illustrate a simplified construction, heretofore referred to, in which the rotating drum of the Fig. 1 construction is dispensed with so that the material admitted to the casing 7a falls directly upon the gate 6a. The air supply is accomplished by the pipe 25 in conjunction with the pipes 23, 75, 75 and 76, 76. An equalizing outlet 77 is also provided for supplying air to the upper portion of the casing. The pipes 76, 76 discharge against the inclined walks 78, 78 of the casing, thus avoiding any tendency of the material to collect at these points, and promoting the feed into the boot. The novelty here resides particularly in the flapper gate and the air cavity or reservoir lying below the plate 63 and the gate. It will be clear that when concrete is filled into the receptacle, there will remain a space not filled with concrete underneath the flapper gate. This space is connected to the general air delivery system by the pipe 25 and will, therefore, contain compressed air submerged behind and under the concrete mass. This air will, of course, materially help the movement of the concrete, but it has further functions than just that. It will be obvious that the gate is so arranged that, when it moves, it simultaneously opens more for the air and closes more for the concrete. Therefore, when a clog occurs in the discharge line, it is possible at one and the same time to choke the concrete and increase the air, and vice versa, when everything is moving smoothly, to increase the concrete and choke the air. The gate serves the further function of acting as a pendulum, useful in breaking up a choking mass of concrete should one occur at the entrance to the boot. In practice, I have found it proper so to build the gate that there is a small open margin around the edge of the gate, as shown in Fig. 10, thus admitting air all around the edge of the gate into the concrete mass. This helps to surround the moving mass of concrete in the delivery pipe 11 with an envelope of air, thus materially lubricating the concrete and assisting in its movement. In practice, I have found it best to adjust the gate once only for each consistency of concrete, and to leave the gate at that opening or position, as long as the concrete does not change. It follows that if the apparatus is designed to be used with only a single consistency of concrete, the construction may be simplified and cheapened by making the gate merely a fixed partition having the desired degree of inclination and opening.

Fig. 14 illustrates a further modification in which the casing 7b is supplied from the pipe 25 as in the construction of Figs. 12 and 13, and a pipe similarly leads to an equalizing outlet in the upper portion of the drums but in which air is supplied to the inclined walls 78, 78 in a different manner. Here the air is supplied to the walls by a pair of nozzles 79, 79 connected to the pipe 25 by means of the pipes 80, 80.

What I claim is:

1. In combination in a pneumatic conveyor, a casing having an inlet for material at its upper side and an outlet at its lower side, a conduit leading from said outlet, a gate for said inlet, means for supplying air under pressure to the casing, a drum mounted for rotation in the casing and provided with an opening through one side adapted in one position of rotation to register with the inlet and in another position to register with said outlet, means for swinging the drum from one position to the other, means for opening and closing said gate, and connections intermediate said means for operating the gate and the means for swinging the drum whereby the swinging movement of the drum from position with its opening registering with said inlet and back to said position occurs between the closing of the gate and its opening.

2. In combination in a pneumatic conveyor, a casing having an inlet for material at its upper side and an outlet at its lower side, a conduit leading from said outlet, a gate for said inlet, means for supplying air under pressure to the casing, a drum mounted for rotation in the casing and provided with an opening through one side adapted in one position of rotation to register with the inlet and in another position to register with said outlet, and means controlled by the movements of the gate operating means for swinging the drum from one position to the other.

3. In combination in a pneumatic conveyor, a casing having an inlet for material at its upper side and an outlet at its lower side, a conduit leading from said outlet, a gate for said inlet, a second gate at the entrance to said conduit adapted to control the flow of material from the casing to the conduit, and means for directing air under pressure along the surface of such second gate in the direction of the flow of the material.

4. In combination in a pneumatic conveyor, a casing having an inlet for material at its upper side, and an outlet at its lower side, a conduit leading from said outlet, a gate for said inlet, a second gate pivoted at the entrance to said conduit adapted to control the flow of material from the casing to the conduit, and means for directing air under pressure along the inner surface of such second gate toward the free end thereof.

5. In combination in a pneumatic conveyor, a casing having an inlet for material at its upper side, and an outlet at its lower side, a conduit leading from said outlet, a gate for said inlet, a second gate pivoted at the entrance to said conduit adapted to control the flow of material from the casing to the conduit, and means for directing air under pressure along both surfaces of such second gate toward the free end thereof.

6. In combination in a pneumatic conveyor, a casing having an inlet for material at its upper side, and an outlet at its lower side, a conduit leading from said outlet, a gate for said inlet, a swinging gate at the entrance to said conduit adapted to control the flow of material from the casing to the conduit, means for supplying air under pressure to the casing above the gate and other means for directing air under pressure into the conduit along the lower side of said swinging gate.

7. In combination in a pneumatic conveyor, a casing having an inlet for material at its upper side and an outlet at its lower side, a conduit leading from said outlet, a gate for said inlet, means for supplying air under pressure to the casing, a second gate at the entrance to said conduit having a hollow pintle and passages leading therefrom through the inner face of the gate, said gate being adapted to control the flow of material from the casing to the conduit, and means for supplying water under pressure to said hollow pintle.

8. In combination in a pneumatic conveyor, a casing having an inlet for material at its upper side and an outlet at its lower side, a conduit leading downwardly and laterally from the said outlet, a gate for said inlet, means for supplying air under pressure to the casing, a swinging gate at the entrance of said conduit adapted to control the flow of material to the conduit, means for adjusting the position of the gate from the exterior of the casing, said swinging gate being pivoted at one edge with its free edge extending laterally in the same direction as said conduit, and means for supplying a separate flow of air under pressure along the lower side of the swinging gate toward the free end thereof.

9. The combination with a casing for receiving material to be conveyed and a conduit leading therefrom, of a swinging gate at the entrance of the conduit against which the material moves by gravity, means for directing a flow of air against such material above the gate to carry it from the gate into the conduit, and means for directing another flow of air under pressure along the lower side of the gate toward the free end thereof.

10. In combination in a pneumatic conveyor, a casing having an inlet for material and a hopper bottom with an outlet, a conduit leading from said outlet, a gate at the entrance of the conduit adapted to receive by gravity the material supplied to the casing, means for directing a blast of air longitudinally of the gate into the conduit, and means for directing other blasts of air downwardly along the sloping sides of the hopper bottom and through the gate.

11. In an apparatus of the class described for handling material, a receptacle having a discharge line leading from its lower portion, such receptacle being divided by a pivoted gate into two unequal parts to which compressed air is supplied and opening jointly into the discharge line, whereby material and compressed air are admitted simultaneously to the discharge line, with an increase in the supply of air to such line and a decrease in the supply of material thereto when the gate is moved in one direction, and a decrease in the supply of air to the line and an increase in the supply of material thereto when the gate is moved in the other direction.

12. In an apparatus of the class described for handling material, a receptacle having a discharge line leading from its lower portion, such receptacle being divided by a pivoted gate into two unequal parts to which compressed air is supplied and opening jointly into the discharge line, whereby material and compressed air are admitted simultaneously to the discharge line, with an increase in the supply of air to such line and a decrease in the supply of material thereto when the gate is moved in one direction, and a decrease in the supply of air to the line and an increase in the supply of material thereto when the gate is moved in the other direction, said gate having its margins spaced away from the walls of the container.

13. In an apparatus of the class described for handling material, a receptacle having a discharge line leading from its lower portion, such receptacle being divided by a pivoted gate into two unequal parts to which compressed air is supplied and opening jointly into the discharge line, whereby material and compressed air are admitted simultaneously to the discharge line, with an increase in the supply of air to such line and a decrease in the supply of material thereto when the gate is moved in one direction, and a decrease in the supply of air to the line and an increase in the supply of material thereto when the gate is moved in the other direction, at least a part of the compressed air admitted to the receptacle being supplied above the mass of material in the receptacle.

14. In combination in a pneumatic conveyor, a casing having an inlet for material and an outlet at its lower side, a discharge line leading from said outlet, a gate at the entrance to said line pivoted at one edge and adapted to control the flow of material to the line, means for admitting air under pressure to the casing above the material therein, and means for admitting air under pressure to the space beneath the gate adjacent the pivoted edge thereof and directing such air along the lower side of the gate toward the free end thereof.

15. In combination in a pneumatic conveyor, a casing having an inlet for material and an outlet at its lower side, a discharge line leading from said outlet, a gate at the entrance to said line pivoted at one edge and adapted to control the flow of material to the line, means for admitting air under pressure to the casing above the material therein, and means for admitting air under pressure to the space beneath the gate adjacent the pivoted edge thereof and directing such air along the lower side of the gate toward the free end thereof, said gate fitting loosely in the casing so as to permit a flow of air past its margins in its various positions of adjustment.

16. In combination in a concrete conveyor, a casing having an inlet for concrete at its upper side and an outlet at its lower side opening into a discharge line, a gate pivotally mounted within the casing with its free end toward the outlet and the pivot away from the outlet, said gate being adapted to control the flow of concrete through the outlet, a partition in inclined position over the gate with its outer end extending over and protecting the pivoted edge of the gate from the concrete, whereby said partition and gate constitute a flow line path for the concrete toward the outlet and whereby said partition and gate provide a submerged air chamber within the casing, means for supplying air under pressure to the casing above the partition to cause a flow thereof toward the outlet and along the upper surface of the gate, and means for admitting air under pressure to the casing below said partition.

17. In combination in a concrete conveyor, a casing having an inlet for concrete at its upper side and an outlet at its lower side opening into a discharge line, an inclined partition extending from one of the side walls of the casing toward said outlet, so that the upper face of the partition forms a slide for the concrete and the lower surface of the partition forms the roof of an air chamber, means for supplying air under pressure to the casing above the partition to cause a flow thereof toward the outlet and over the partition, and means for supplying air under pressure immediately below the partition.

In testimony whereof, I have hereunto subscribed my name this 7th day of May, 1931.

ALEXIS SAURBREY.